United States Patent [19]
Kakii et al.

[11] Patent Number: 4,726,647
[45] Date of Patent: Feb. 23, 1988

[54] OPTICAL CONNECTOR

[75] Inventors: Toshiaki Kakii; Naoshi Hakamata; Shuzo Suzuki, all of Yokohama, Japan

[73] Assignee: Sumitomo Electric Industries, Ltd., Osaka, Japan

[21] Appl. No.: 841,101

[22] Filed: Mar. 18, 1986

[30] Foreign Application Priority Data

Mar. 19, 1986 [JP] Japan .................................. 60-56416

[51] Int. Cl.⁴ ................................................ G02B 6/38
[52] U.S. Cl. ................................ 350/96.21; 350/96.20
[58] Field of Search ................ 350/96.1, 96.20, 96.21, 350/96.22

[56] References Cited

U.S. PATENT DOCUMENTS

| | | | |
|---|---|---|---|
| 4,046,453 | 9/1977 | Fiebelkorn et al. | 350/96.21 |
| 4,186,997 | 2/1980 | Schumacher | 350/96.21 |
| 4,268,115 | 5/1981 | Slemon et al. | 350/96.20 |
| 4,548,467 | 10/1985 | Stoerk et al. | 350/96.21 |
| 4,684,210 | 8/1987 | Matsunaga et al. | 350/96.20 |

Primary Examiner—William L. Sikes
Assistant Examiner—Frank González
Attorney, Agent, or Firm—Cushman, Darby & Cushman

[57] ABSTRACT

An optical connector for joining ends of optical fibers, including an adapter formed with at least one claw and a plug coupled detachably with the adapter. The plug includes an insertion guide to be inserted into the adapter, an ejector and an urging member for urging the ejector in an axial insertion direction, while the insertion guide is formed, on its outer periphery, with a projection and a recess such that the claw is caused to ride over the projection into engagement with the recess at the time of coupling of the plug with the adapter.

5 Claims, 3 Drawing Figures

OPTICAL CONNECTOR

BACKGROUND OF THE INVENTION

The present invention generally relates to optical fibers and more particularly, to an optical connector for detachably joining ends of the optical fibers, which is constituted by a pair of plugs and an adaptor.

Conventionally, in optical connectors, it has been generally so arranged that plugs and the adapter are coupled with each other through threaded engagement therebetween or bayonet locking. In FIG. 1, there is shown a prior art optical connector of thread type in which a pair of the plugs and the adapter are coupled with each other through threaded engagement therebetween. The prior art optical connector includes a pair of plugs 25 and an adapter 20. A pair of external thread portions 21 are formed around outer peripheries of opposite end portions of the adapter 20, respectively. Meanwhile, each of the plugs 25 has a housing 27 and a ferrule 26. The housing 27 is formed, around its inner periphery, with an internal thread portion engageable with each of the external thread portions 21. The ferrule 26 having a coated fiber 28 secured therein is urged by a spring so as to be held by the housing 27. Furthermore, a sleeve for fitting the ferrule 26 thereinto is mounted in the adapter 20. Thus, in the known optical connector, the ferrule 26 of each of the plugs 25 is fitted into the sleeve in the adapter 20 through engagement of the internal thread portion of the housing 27 of each of the plugs 25 with each of the external thread portions 21 such that a pair of the plugs 25 are coupled with the adapter 20.

However, in the prior art optical connector referred to above, when ends of the coated fibers 28 are joined to or detached from each other, an operator should rotate the plugs 25 relative to the adapter 20 by gripping each of the plugs 25 with his fingers. Thus, the known optical connector has such a drawback that a space for rotating the plugs 25 relative to the adapter 20 is required to be provided, thereby resulting in deterioration of mounting density for mounting the known optical connector.

Furthermore, in the known optical connectors of thread type or bayonet type, since the housing of the plug is rotated for threaded engagement or bayonet locking, the ferrule is rotated slightly when the ferrule is fitted into the sleeve. Therefore, the prior art optical connectors have such a disadvantage that in the case where the optical fibers of the opposed ferrules are brought into direct contact (optical contact) with each other, the confronting end faces of the ferrules may be severely damaged at the time of contact therebetween due to rotation of the ferrules.

SUMMARY OF THE INVENTION

Accordingly, an essential object of the present invention is to provide an optical connector in which a pair of plugs and an adapter are coupled with or uncoupled from each other only through axial operations without the need for rotational operations associated with prior art optical connectors, with substantial elimination of the disadvantages inherent in the prior art optical connectors.

In order to accomplish this object of the present invention, an optical connector for joining ends of optical fibers, embodying the present invention comprises: an adaptor which is formed with at least one claw; and a plug which is detachably coupled with said adapter; said plug including an insertion guide to be inserted into said adaptor, an ejector disposed radially outwardly of said insertion guide and an urging member for urging said ejector in an axial insertion direction for inserting said insertion guide into said adapter; said insertion guide being formed, on an outer peripheral face thereof, with a projection and a recess disposed rearwardly of said projection in the axial insertion direction, whereby at the time of coupling of said plug with said adapter, said claw, upon insertion of said insertion guide into said adapter, is caused to ride onto said projection through elastic deformation of said claw so as to be brought into contact with said ejector and then, upon further insertion of said insertion guide into said adapter, said claw depresses said ejector in a direction opposite to the axial insertion direction so as to ride over said projection into engagement with said recess and said ejector is displaced in the axial insertion direction by said urging member through disengagement of said claw from said ejector so as to enclose said claw such that said plug is coupled with said adapter, while at the time of uncoupling of said plug from said adapter, said ejector is released away from said claw upon displacement of said ejector in the direction opposite to the axial insertion direction and then, upon further displacement of said ejector in the direction opposite to the axial insertion direction, said claw is brought out of engagement with said recess so as to ride over said projection such that said plug is uncoupled from said adapter.

BRIEF DESCRIPTION OF THE DRAWINGS

This object and features of the present invention will become apparent from the following description taken in conjunction with the preferred embodiment thereof with reference to the accompanying drawings, in which.

DETAILED DESCRIPTION OF THE INVENTION

Figure 2:
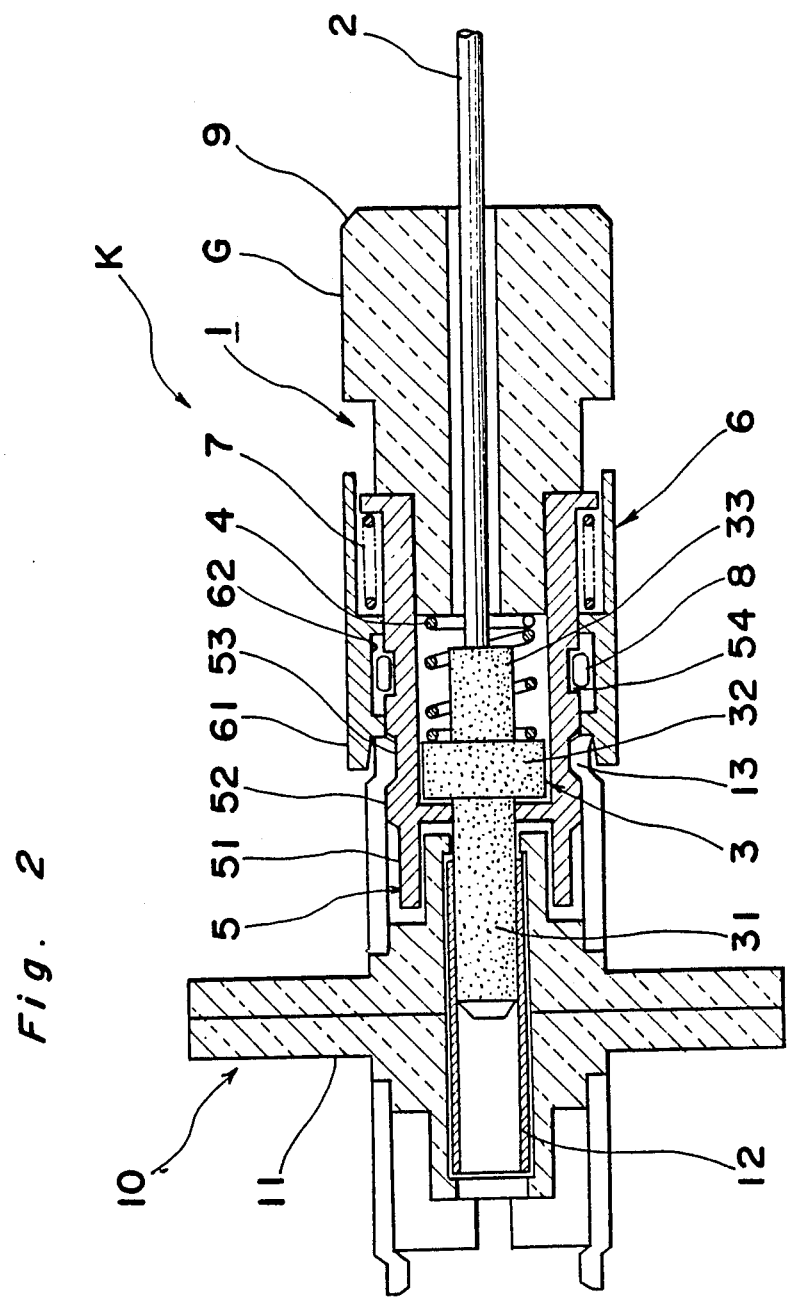
FIG. 2 is a longitudinal sectional view of an optical connector according to the present invention.

Referring to FIG. 2, there is shown an optical connector K according to one preferred embodiment of the present invention, in which a pair of plugs 1 and an adapter 10 are coupled with each other. Since a pair of the plugs 1 are disposed symmetrically with respect to the adapter 10, only one of the plugs 1 is shown in FIG. 2. The plug 1 includes a ferrule 3 mounted on a distal end portion of a coated fiber 2, an insertion guide 5, an ejector 6 and a rear body 9. The ferrule 3 is constituted by an insertion portion 31 fitted into a sleeve 12 in the adapter 10, a flange portion 32 and a rear portion 33. An urging member 4 is disposed around an outer periphery of the rear portion 33 so as to axially urge, at the rear portion 33, the ferrule 3 towards the adapter 10. The insertion guide 5 is mounted on the rear body 9 so as to surround the urging member 4 such that the ferrule 3 is enclosed by the insertion guide 5. The insertion guide 5 has a pair of guide portions 51, a pair of projections 52 and a pair of recesses 53 formed sequentially in this order for a pair of claws 13 of the adapter 10 such that the claws 13 are finally brought into engagement with the recesses 53. The insertion guide 5 is further formed with a groove 54 for positioning an elastic member 8.

The ejector 6 has a distal end portion 61 and surrounds the insertion guide 5. When the claws 13 of the adapter 10 have been brought into engagement with the recesses 53 of the insertion guide 5, the claws 13 are enclosed by the distal end portion 61. The ejector 6 is axially depressed towards the adapter 10 by an urging member 7 so as to be secured through its contact with the radially acting elastic member 8 such as a C-shaped retaining ring.

Meanwhile, the adapter 10 is constituted by a sleeve 12 for supporting the ferrule 3 through positioning of the ferrule 3 and a housing 11 having a pair of the claws 13 engageable with the recesses 53 of the insertion guide 5. The sleeve 12 is disposed in the housing 11. Each of the claws 13 is tapered at forward and rearward portions of its distal end. Thus, the insertion guide 5 can be easily fitted into the housing 11. Meanwhile, the claws 13 are locked by the ejector 6 so as to be least disengaged from the insertion guide 5.

In FIG. 2, the present invention is applied to the coated fiber 2. It is needless to say, however, that the present invention also can be applied to an optical fiber cord accommodating the coated fiber 2 and a high-tensile fiber sheath by securing the high-tensile fiber sheath to, for example, the rear body 9. Meanwhile, a pair of the claws 13 are provided in the adapter 10 in this embodiment but, needless to say, can be further increased in number.

When the plug 1 is coupled with the adapter 10, the claws 13 are inserted into the guide portions 51 of the insertion guide 5 by inserting the insertion guide 5 into the housing 11. Subsequently, the claws are elastically deformed so as to ride onto the projections 52 of the insertion guide 5 so as to butt against the distal end portion 61 of the ejector 6.

Then, when the insertion guide 5 is further inserted into the housing 11, the ejector 6 is depressed away from the adapter 10 by the claws 13 against an urging force of the urging member 7. Thereafter, when the claws 13 are brought into engagement with the recesses 53 after having ridden over the projections 52, the claws 13 are disposed radially inwardly of an inside diameter of the distal end portion 61 of the ejector 6. As a result, the distal end portion of the ejector 6 and the claws 13 are brought out of contact with each other. Thus, the ejector 6 is depressed towards the adapter 10 by the urging force of the urging member 7 so as to enclose the claws 13. Accordingly, a portion of the ejector 6 is axially brought into pressing contact with a portion of the claws 13, so that the plug 1 and the adapter 10 are coupled with each other.

As will be seen from the foregoing, in the optical connector K of the present invention, since the claws 13 of the adapter 10 are brought into engagement with the recesses 53 of the insertion guide 5 and then, are locked by the distal end portion 61 of the ejector 6, the plug 1 and the adapter 10 are not uncoupled from each other even if the plush ring 9 is pulled away from the adapter 10.

Subsequently, when the plug 1 is uncoupled from the adapter 10, the ejector 6 is pulled away from the adapter 10 by gripping the ejector 6 and thus, the ejector 6 is disengaged from the claws 13 so as to unlock the claws 13. By further pulling the ejector 6 away from the adapter 10, the claws 13 ride over the projections 52 from the recesses 53, so that the plug 1 and the adapter 10 are uncoupled from each other.

Meanwhile, assembly of the insertion guide 5 and the ejector 6 is performed as follows. Initially, the urging member 7 is fitted around the insertion guide 5 and then, the radially acting elastic member 8 such as a C-shaped retaining ring is set in the groove 54. Thereafter, the ejector 6 is depressed so as to be fitted around the insertion guide 5, so that the elastic member 8 is held in a groove 62 of the ejector 6 and thus, the insertion guide 5 and the ejector 6 are coupled with each other.

Meanwhile, it will be apparent from the description given so far that only axial operations are required for coupling the plug 1 and the adapter 10 with each other or uncoupling the plug 1 and the adapter 10 from each other in the optical connector K of the present invention. However, in order to more positively prevent rotation of the ferrule 3 at the time of coupling of the plug 1 and the adapter 10 with each other, a stopper for preventing rotation of the ferrule 3 is desirably provided between the ferrule 3 and the insertion guide 5. Furthermore, in order to prevent rotation of the adapter 10 relative to the plug 1, it is preferable that another stopper for preventing rotation of the adapter 10 relative to the plug 1 be provided between the adapter 10 and the insertion guide 5.

One concrete example of the optical connector K of the present invention will be described, hereinbelow. A maximum outside diameter of the plug 1, i.e., an outside diameter of the ejector 6 is about 8 mm. The plug 1 has an overall length of about 30 mm. Housing components of the plug 1, i.e., the insertion guide 5, the ejector 6 and the rear body 9 are made of stainless steel or brass. The ejector 6 and the rear body 9 are knurled on their outer peripheries so as to enable the operator to securely grip the ejector 6 and the rear body 9 with his fingers without slip. The ejector 6 has a length of about 10 mm. Since a grip portion C of the rear body 9, which is to be gripped by the operator's fingers at the time of insertion of the insertion guide 5 into the housing 11, is of about 8 mm in length, the rear body 9 can be manipulated easily. Meanwhile, the housing 11 of the adapter 10 is made of phosphor bronze having large elasticity. The adapter 10 has the two claws 13. Each of the claws 13 is formed, at forward and rearward portions of its distal end, with tapered surfaces having a taper of about 45°.

It was found by the present inventors that a force required for coupling and uncoupling of the plug 1 and the adapter 10 is an axial force of about 1.3 kg. Therefore, the plug 1 and the adapter 10 can be coupled with and uncoupled from each other only by the axial force, thereby resulting in high working efficiency.

Meanwhile, the optical connector K of the present invention was applied to an optical fiber cord accommodating the coated fiber 2 and a high-tensile fiber sheath and a tensile test was performed in whcih the optical fiber cord is pulled by fixing to one of the housing components of the plug 1, e.g., the rear body 9, the high-tensile fiber sheath made of, for example, Kevlar (name used in trade and manufactured by E. I. du Pont de Nemours & Co., Inc. of the U.S.A.). It was found in the tensile test that when a tensile force of not more than 20 kg is applied to 20 samples of the optical connector K, the plug 1 and the adapter 10 are not uncoupled from each other in any one of the 20 samples of the optical connector K, thus ensuring that the plug 1 and the adapter 10 are securely coupled with each other.

Furthermore, a vibration test was performed in which vibrations of ±5 mm are applied to 10 samples of the optical connector K at a frequency of 20 Hz in axial and radial directions for 10 hr., respectively. It was found in the vibration test that variations in coupling loss are not more than 0.01 dB in any one of the 10 samples of the optical connector K, which offers no problem for practical use. Moreover, a coupling and uncoupling test was conducted in which coupling and uncoupling of 10 samples of the optical connector K are performed 1,000 times. The coupling and uncoupling test shows that such a phenomenon as improper functioning of the claws 13 and the insertion guide 5 due to their wear does not take place and the plug 1 and the adapter 10 are coupled with each other at a tensile strength of not less than 10 kg in any one of the 10 samples of the optical connector K after 1,000 times of coupling and uncoupling of the 10 samples of the optical connector K.

Furthermore, another coupling and uncoupling test was conducted in which coupling and uncoupling of five samples of the optical connector K are performed 1,000 times by using the ferrules to be brought into optical contact with each other. The coupling and uncoupling test revealed that the coupling loss is not more than 0.2 dB identical with that of the initial state in any one of the five samples of the optical connector K after 1,000 times of coupling and uncoupling of the optical connector K and the reflective attenuation is not less than −28 dB, which indicates that the end faces of the ferrules 3 are scarcely deteriorated.

In the above described embodiment of the present invention, the housing 11 of the adapter 10 and the housing components of the plug 1, i.e., the insertion guide 5, the ejector 6 and the rear body 9 are made of metals. However, the housing 11 of the adapter 10 and the housing components of the plug 1 may be made of plastics. It can be further so arranged that the housing 11 of the adapter 10 and the housing components of the plug 1 are made of metals and plastics in combination.

Figure 1:
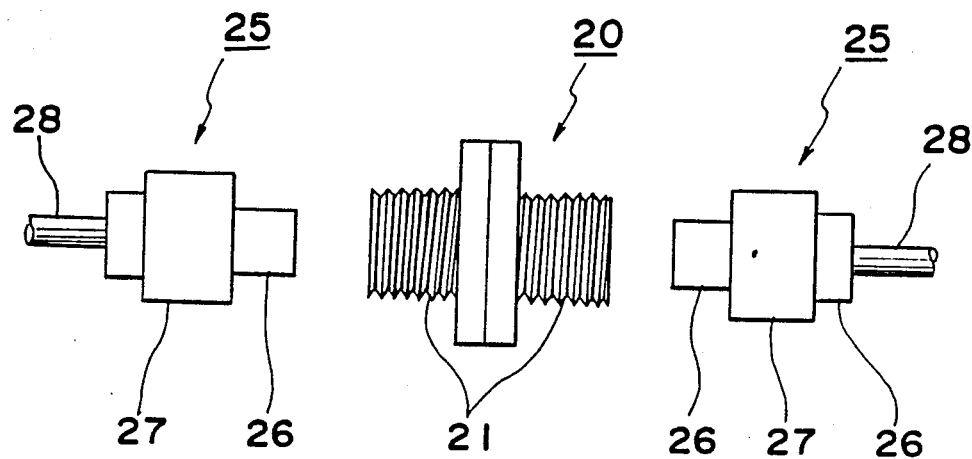
FIG. 1 is a schematic view of a prior art thread type optical connector (already referred to)
Figure 3:
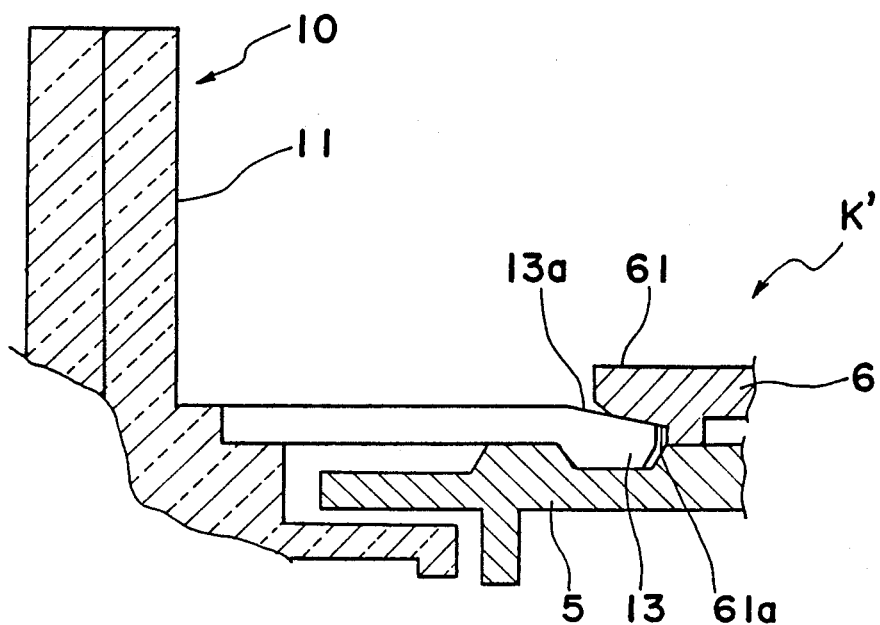
FIG. 3 is a partial longitudinal sectional view of a modification of the optical connector of FIG. 2.

In the optical connector K of the present invention, the claws 13 of the adapter 10 are secured through pressing contact of the distal end portion 61 with the claws 13. However, since it is only necessary to bring a portion of the ejector 6 into pressing contact with the claws 13, this arrangement of the optical connector K can be modified variously. For example, as shown in FIG. 3, in an optical connector K' which is a modification of the optical connector K, each of the claws 13 and the distal end portion 61 have tapered surfaces 13a and 61a engageable with each other, respectively. Thus, in the optical connector K', since the tapered surface 13a of each of the claws 13 and the tapered surface 61a of the distal end portion 61 are brought into engagement with each other, the plug 1 and the adapter 10 are further securely coupled with each other.

Furthermore, in the optical connector K, a compression spring is used as the urging member 7 for depressing the ejector 6 towards the adapter 10 but can be replaced by a leaf spring fitted in a tapered groove (not shown) formed between the ejector 6 and the insertion guide 5. Alternatively, a magnet may be used as the urging member 7 by utilizing attraction force and repulsion force of the magnet.

As is clear from the foregoing description, in the optical connector of the preset invention, the following effects (1) to (4) can be achieved.

(1) The plugs and the adapter can be coupled with or uncoupled from each other only through axial operations without the need for rotational operations associated with the prior art optical connectors. Therefore, in the optical connector of the present invention, since a space for rotating the plugs relative to the adapter is not required to be provided, mounting density for mounting the optical connector can be improved.

(2) The plugs and the adapter are coupled with each other without rotating the plugs relative to the adapter. Accordingly, even in the case where the optical fibers of the opposed ferrules are brought into optical contact with each other, such a phenomenon can be prevented that the confronting end faces of the ferrules are damaged at the time of contact therebetween due to rotation of the ferrules.

(3) Since coupling between the adapter and the plugs is locked through pressing contact of a portion of the ejector with the claws of the adapter, the plugs and the adapter can be coupled with each other easily and securely.

(4) Since the ejector and the insertion guide are assembled with each other through the radially acting elastic member, it becomes possible to reduce outside diameter of the plugs.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical connector for joining ends of optical fibers, comprising:

an adapter which is formed with at least one claw; and a plug which is detachably coupled with said adapter; said plug including an insertion guide to be inserted into said adapter, an ejector disposed radially outwardly of said insertion guide and an urging member for urging said ejector in an axial insertion direction for inserting said insertion guide into said adapter;

said insertion guide being formed, on an outer peripheral face thereof, with a projection and a recess disposed rearwardly of said projection in the axial insertion direction, whereby at the time of coupling of said plug with said adapter, said claw, upon insertion of said insertion guide into said adapter, is caused to ride onto said projection through elastic deformation of said claw so as to be brought into contact with said ejector and then, upon further insertion of said insertion guide into said adapter, said claw depresses said ejector in a direction opposite to the axial insertion direction so as to ride over said projection into engagement with said recess and said ejector is displaced in the axial insertion direction by said urging member through disengagement of said claw from said ejector so as to enclose said claw such that said plug coupled with said adapter, while at the time of uncoupling of said plug from said adapter, said ejector is released away from said claw upon displacement of said ejector in the direction opposite to the axial insertion direction and then, upon further displacement of said ejector in the direction opposite to the axial insertion direction, said claw is brought out of engagement with said recess so as to ride over said projection such that said plug is uncoupled from said adapter.

2. An optical connector as claimed in claim 1, wherein when said plug has been coupled with said adapter, said ejector is at least partially held in pressing contact with said claw.

3. An optical connector as claimed in claim 2, wherein said ejector is formed with a tapered surface and said claw is formed with a mating tapered surface engageable with said tapered surface such that said ejector is held in pressing contact with said claw through engagement between said tapered surface and said mating tapered surface.

4. An optical connector as claimed in claim 1, wherein said plug further includes a radially acting elastic member such that said ejector and said insertion guide are assembled with each other through said elastic member.

5. An optical connector as claimed in claim 4, wherein said elastic member is a retaining ring.

* * * * *